US006761941B2

(12) United States Patent
Kobayashi et al.

(10) Patent No.: US 6,761,941 B2
(45) Date of Patent: Jul. 13, 2004

(54) INKJET RECORDING SHEET

(75) Inventors: Takashi Kobayashi, Shizuoka-ken (JP); Katsuyoshi Suzuki, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 78 days.

(21) Appl. No.: 10/115,283

(22) Filed: Apr. 4, 2002

(65) Prior Publication Data

US 2002/0176970 A1 Nov. 28, 2002

(30) Foreign Application Priority Data

Apr. 6, 2001 (JP) ....................................... 2001-108929

(51) Int. Cl.$^{7}$ .................................................. B32B 3/00

(52) U.S. Cl. ................................ 428/32.26; 428/32.28; 428/32.3; 428/32.33; 428/32.34

(58) Field of Search ........................... 428/32.26, 32.28, 428/32.3, 32.33, 32.34

(56) References Cited

U.S. PATENT DOCUMENTS

| | | | | | |
|---|---|---|---|---|---|
| 5,202,205 | A | * | 4/1993 | Malhota | 430/17 |
| 5,310,778 | A | * | 5/1994 | Shor et al. | 524/556 |
| 6,165,606 | A | * | 12/2000 | Kasahara et al. | 428/323 |
| 6,183,851 | B1 | * | 2/2001 | Mishima | 428/304.4 |
| 6,217,166 | B1 | * | 4/2001 | Saito et al. | 347/100 |
| 6,387,473 | B1 | * | 5/2002 | Sismondi et al. | 428/32.34 |
| 6,495,242 | B1 | * | 12/2002 | Tsuchiya et al. | 428/195 |

FOREIGN PATENT DOCUMENTS

| | | |
|---|---|---|
| JP | 62-204989 | 9/1987 |
| JP | 6-270531 | 9/1994 |
| JP | 7-179026 | 7/1995 |
| JP | 9-164762 | 6/1997 |
| JP | 10-119423 | 5/1998 |
| JP | 10-217601 | 8/1998 |
| JP | 11-115308 | 4/1999 |
| JP | 11-192777 | 7/1999 |
| JP | 11-348412 | 12/1999 |
| JP | 2001-10211 | 1/2001 |
| JP | 2001-301314 | 10/2001 |

* cited by examiner

*Primary Examiner*—B. Shewareged
(74) *Attorney, Agent, or Firm*—Sughrue Mion, PLLC

(57) ABSTRACT

Disclosed is an inkjet recording sheet having a colorant-receiving layer on the surface of its support, in which the colorant-receiving layer contains at least one of compounds represented by the following general formula (1) and compounds represented by the following general formula (2), and contains a vapor-phase-process silica, a polyvinyl alcohol, a boron compound, and a mordant. In the formulae, R represents a saturated hydrocarbon group having from 1 to 12 carbon atoms, an unsaturated hydrocarbon group having from 1 to 12 carbon atoms, a phenyl group, or an acyl group, and n indicates an integer of 1 to 3.

$$RO(CH_2CH_2O)_nH \quad (1)$$

$$RO(CH_2CH(CH_3)O)_nH \quad (2)$$

18 Claims, No Drawings

INKJET RECORDING SHEET

BACKGROUND OF THE INVENTION

1. Field of the Invention

The present invention relates to a recording material suitable for inkjet recording with liquid ink such as aqueous ink (containing a colorant of dye or pigment) or oily ink or with solid ink that is solid at room temperature but is melted into liquid for image formation. Precisely, the present invention relates to an inkjet recording sheet having the advantage of good receptivity to ink.

2. Description of the Related Art

With remarkable development of information industries in recent years, various information-processing systems have been developed, and various recording methods and devices suitable for such information systems have been developed and put into practical use.

Among the recording methods for information systems, an inkjet recording method has become much popularized not only in office use but also in home use, since it is applicable to various recording materials and the hardware for it is relatively inexpensive and compact and is not so noisy while driven.

With the increase in image resolution in recent inkjet printers, it has become possible to obtain photographic high-quality images in inkjet recording. On the other hand, the hardware for inkjet recording has also been much developed, and various inkjet recording sheets have been developed.

In general, the necessary properties of inkjet recording sheets are that (1) they can rapidly dry (that is, they can rapidly absorb ink), (2) they can receive suitable and uniform ink dots (with no ink bleeding), (3) the granularity of images recorded on them is good, (4) the circularity of ink dots they have received is good, (5) the color density of images recorded on them is high, (6) the color saturation of images recorded on them is high, (7) after printed, they have good lightfastness and waterproofness, (8) their whiteness is high, (9) their storability is good (that is, they do not yellow even after stored long), (10) they hardly deform and their dimensional stability is good (that is, they curl little), and (11) they well run in hardware. In addition, photographic glossy paper to form photographic high-quality images thereon are further desired to have high glossiness, good surface smoothness and a printing paper feel like silver-salt photographs, in addition to the properties mentioned above.

To improve these properties, an inkjet recording sheet with a porous colorant-receiving layer has been developed and put into practical use. Having a porous structure, the colorant-receiving layer of the inkjet recording sheet can rapidly absorb ink (that is, the sheet rapidly dries), and the sheet is glossy.

However, the porous structure-having inkjet recording sheet is problematic in that the porous colorant-receiving layer thereof may crack and the sheet itself often curls since the colorant-receiving layer shrinks in dry while its porous structure is formed. If the layer cracks, the yield of the recording sheet lowers and the quality thereof worsens; and if the recording sheet curls, it could not well run in printers. On the other hand, when the porosity of the colorant-receiving layer is increased in some degree, the amount of fine inorganic pigment particles such as silica to be in the porous layer inevitably increases relative to the binder therein, and the adhesion of the colorant-receiving layer to the support is thereby lowered. This is another problem with the porous structure-having inkjet recording sheet.

In Japanese Patent Application Laid-Open (JP-A) 6-270531, proposed is an inkjet recording sheet that contains a sol filler of silica sol or alumina sol, an inorganic filler of aluminium hydroxide, clay, talc, calcium carbonate or barium sulfate, or a resin filler of acrylic resin, halogeno-olefin resin or melamine resin. Containing such filler, the ink-receiving layer of the recording sheet is prevented from cracking while it is formed and dried, and its dry surface strength is high. However, the filler used does not still solve the problem of poor ink absorbability and poor glossiness of the sheet.

In JP-A 10-119423 and 10-217601, proposed is an inkjet recording sheet having a colorant-receiving layer formed on its support, in which the layer contains fine inorganic pigment particles and a water-soluble resin and its porosity is high.

Having such a structure, the recording sheet proposed has a good ability to absorb ink and has a good ability to receive ink to form high-resolution images thereon and its glossiness is high, but when it is stored for a long time in a high-temperature and high-humidity atmosphere after processed to have images thereon, the solvent in the colorant-receiving layer thereof diffuses along with dye therein to thereby cause a problem of image bleeding in the sheet. The problem is referred to as “time-dependent image bleeding” in stored color prints.

In JP-A 2001-10211, proposed is an inkjet recording sheet that contains polyvinyl alcohol and a water-soluble plasticizer for polyvinyl alcohol in its ink-receiving layer for the purpose of increasing the print density and the glossiness thereof and improving the ink absorbability and the cracking resistance thereof. In this, the water-soluble plasticizer used is ethylene glycol, diethylene glycol or triethylene glycol, and it worsens the storage stability of the coating liquid for the ink-receiving layer. When the sheet contains urea, it often deposits on the surface of the ink-receiving layer while the recording sheet is stored for a long time.

As in the above, the conventional inkjet recording sheets must be further improved in many aspects of, for example, improving the properties of the sheets, preventing the colorant-receiving layer from shrinking in dry while its porous structure is formed, preventing the layer from cracking, improving the ability of the sheets to smoothly run in printers and increasing the adhesion of the colorant-receiving layer to the support.

Anyhow, at present, no one has succeeded in providing a satisfactory inkjet recording sheet that satisfies all the following requirements: Its colorant-receiving layer is tough, not readily cracking, and has a good ink absorbability to form high-resolution images, or that is, the layer has a good ink absorbability; the images formed are glossy and have good lightfastness and good waterproofness not bleeding even after stored for a long time; the images formed are vivid and have a high density, and they can be stably stored for a long time as they are, or that is, the images have good storage stability; and the colorant-receiving layer of the sheet shrinks little in dry while its porous structure is formed, and it well adheres to the support.

SUMMARY OF THE PRESENT INVENTION

The present invention is to solve the problems in the prior art noted above, and to attain the objects mentioned below.

Specifically, one object of the present invention is to provide an inkjet recording sheet that satisfies the following requirements: Its colorant-receiving layer has good ink absorbability, and does not shrink in dry while the porous structure of the layer is formed; the layer does not crack and the sheet having the layer does not curl, or that is, the productivity of the sheet is high, the quality of the sheet is good, and the ability of the sheet to smoothly run in printers is good; and the colorant-receiving layer well adheres to the support.

Another object of the present invention is to provide an inkjet recording sheet, which is tough, not readily cracking, and has a good ink absorbability to form high-resolution images thereon.

Still another object of the present invention is to provide an inkjet recording sheet which is, after processed to form images thereon, highly resistant to water and glossy with no problem of time-dependent image bleeding, and is highly resistant to light such as sunlight and fluorescent light.

The objects of the present invention are attained as follows.

In, its first aspect, the present invention provides an inkjet recording sheet comprising a support and, on a surface of the support, a colorant-receiving layer including at least one of a compound represented by the following general formula (1) and a compound represented by the following general formula (2) and including a vapor-phase-process silica, a polyvinyl alcohol, a boron compound, and a mordant:

$$RO(CH_2CH_2O)_nH \quad (1)$$

wherein, in the formula (1): R represents a saturated hydrocarbon group having from 1 to 12 carbon atoms, an unsaturated hydrocarbon group having from 1 to 12 carbon atoms, a phenyl group, or an acyl group; and n represents an integer of 1 to 3, $$RO(CH_2CH(CH_3)O)_nH \quad (2)$$

and in the formula (2): R represents a saturated hydrocarbon group having from 1 to 12 carbon atoms, an unsaturated hydrocarbon group having from 1 to 12 carbon atoms, a phenyl group, or an acyl group; and n represents an integer of 1 to 3.

In its second aspect, the present invention provides the inkjet recording sheet of the first aspect wherein the at least one of compounds represented by formulae (1) and (2) comprise a compound that is substantially soluble in water.

In its third aspect, the present invention provides the inkjet recording sheet of the first aspect wherein R in at least one of formulae (1) and (2) represents a saturated hydrocarbon group having from 1 to 4 carbon atoms.

In its fourth aspect, the present invention provides the inkjet recording sheet of the first aspect wherein the at least one of compounds represented by formulae (1) and (2) is selected from the group consisting of ethylene glycol monomethyl ether, ethylene glycol monoethyl ether, ethylene glycol monobutyl ether, ethylene glycol monohexyl ether, ethylene glycol monoallyl ether, ethylene glycol monophenyl ether, diethylene glycol monomethyl ether, diethylene glycol monoethyl ether, diethylene glycol monobutyl ether, diethylene glycol monohexyl ether, diethylene glycol monododecyl ether, triethylene glycol monomethyl ether, triethylene glycol monoethyl ether, triethylene glycol monobutyl ether, propylene glycol monomethyl ether, propylene glycol monoethyl ether, and propylene glycol monobutyl ether.

In its fifth aspect, the present invention provides the inkjet recording sheet of the first aspect wherein total content in the colorant-receiving layer of the at least one of compounds represented by formulae (1) and (2) is from 0.1 to 5.0 $g/m^2$.

In its sixth aspect, the present invention provides the inkjet recording sheet of the first aspect wherein the at least one of compounds represented by formulae (1) and (2) in the colorant-receiving layer comprises a weight x of at least one compound represented by formula (1) and a weight y of at least one compound represented by formula (2), and the weight ratio x/y is from 100/1 to 100/100.

In its seventh aspect, the present invention provides the inkjet recording sheet of the first aspect wherein the vapor-phase-process silica comprises a mean primary particle size of at most 30 nm.

In its eighth aspect, the present invention provides the inkjet recording sheet of the first aspect wherein the vapor-phase-process silica comprises a mean primary particle size of from 3 nm to 10 nm.

In its ninth aspect, the present invention provides the inkjet recording sheet of the first aspect wherein the polyvinyl alcohol comprises a polyvinyl alcohol selected from the group consisting of polyvinyl alcohol, cation-modified polyvinyl alcohol, anion-modified polyvinyl alcohol, silanol-modified polyvinyl alcohol, and polyvinyl alcohol derivatives.

In its tenth aspect, the present invention provides the inkjet recording sheet of the first aspect wherein polyvinyl alcohol content of the colorant-receiving layer is from 9 to 40% by weight of total solid content of the layer.

In its eleventh aspect, the present invention provides the inkjet recording sheet of the first aspect wherein the polyvinyl alcohol comprises a degree of saponification of from 70% to 99%.

In its twelfth aspect, the present invention provides the inkjet recording sheet of the first aspect wherein the vapor-phase-process silica in the colorant-receiving layer comprises weight i, polyvinyl alcohol in the colorant-receiving layer comprises weight p, and the content ratio by weight i/p is from 1.5/1 to 10/1.

In its thirteenth aspect, the present invention provides the inkjet recording sheet of the first aspect wherein the boron compound comprises a boron compound selected from the group consisting of borax, boric acids, borates, diborates, metaborates, tetraborates and pentaborates.

In its fourteenth aspect, the present invention provides the inkjet recording sheet of the first aspect wherein the mordant comprises a cationic mordant.

In its fifteenth aspect, the present invention provides the inkjet recording sheet of the first aspect wherein the colorant-receiving layer is formed by: applying a coating liquid that includes the at least one of a compound represented by formula (1) and a compound represented by formula (2), the vapor-phase-process silica, and the polyvinyl alcohol onto the surface of the support by using a coater; applying a solution that includes the boron compound and the mordant onto a coating layer formed by the coating liquid substantially simultaneously with applying the coating liquid or while the coating layer is drying but before a falling-drying-rate period; and curing the coating layer.

In its sixteen aspect, the present invention provides the inkjet recording sheet of the first aspect wherein the colorant-receiving layer is formed by: applying a coating liquid onto the surface of the support by using a coater, the coating liquid being prepared by adding a solution that includes the at least one of a compound represented by formula (1) and a compound represented by formula (2), the polyvinyl alcohol, and the boron compound to an aqueous dispersion that includes the vapor-phase-process silica and a dispersant, and re-dispersing the aqueous dispersion and the added solution; applying a solution that includes the boron compound and the mordant onto a coating layer formed by the coating liquid substantially simultaneously with applying the coating liquid or while the coating layer is drying but before a falling-drying-rate period; and curing the coating layer.

In its seventeenth aspect, the present invention provides the inkjet recording sheet of the sixteenth aspect wherein the dispersant comprises a cationic polymer.

In its eighteenth aspect, the present invention provides the inkjet recording sheet of the sixteenth aspect wherein the dispersant comprises a weight-average molecular weight of from 1000 to 200000.

In its nineteenth aspect, the present invention provides the inkjet recording sheet of the first aspect wherein the colorant-receiving layer comprises a thickness of from 10 $\mu$m to 50 $\mu$m.

In its twentieth aspect, the present invention provides the inkjet recording sheet of the first aspect wherein the sheet comprises a surface glossiness at 60° of at least 30%.

In its twenty-first aspect, the present invention provides a method for forming a colorant-receiving layer of an inkjet recording sheet, the method comprising the steps of: preparing a coating liquid that includes a vapor-phase-process silica, a polyvinyl alcohol, and at least one of a compound represented by the following general formula (1) and a compound represented by the following general formula (2):

$$RO(CH_2CH_2O)_nH \quad (1)$$

$$RO(CH_2CH(CH_3)O)_nH \quad (2)$$

in which formulae (1) and (2), R represents a saturated hydrocarbon group having from 1 to 12 carbon atoms, an unsaturated hydrocarbon group having from 1 to 12 carbon atoms, a phenyl group, or an acyl group, and n represents an integer of 1 to 3; preparing a solution that includes a boron compound and a mordant; applying the coating liquid onto a surface of a support by using a coater; applying the solution onto a coating layer formed by the coating liquid at a time after commencement of the step of applying the coating solution but before a falling-drying-rate period of drying of the coating layer; and curing the coating layer.

In its twenty-second aspect, the present invention provides a method for forming a colorant-receiving layer of an inkjet recording sheet, the method comprising the steps of: preparing a solution that includes a polyvinyl alcohol, a boron compound, and at least one of a compound represented by the following general formula (1) and a compound represented by the following general formula (2):

$$RO(CH_2CH_2O)_nH \quad (1)$$

$$RO(CH_2CH(CH_3)O)_nH \quad (2)$$

in which formulae (1) and (2), R represents a saturated hydrocarbon group having from 1 to 12 carbon atoms, an unsaturated hydrocarbon group having from 1 to 12 carbon atoms, a phenyl group, or an acyl group, and n represents an integer of 1 to 3; preparing an aqueous dispersion that includes a vapor-phase-process silica and a dispersant; adding the solution to the aqueous dispersion and re-dispersing the same for forming a coating liquid; applying the coating liquid onto a surface of a support by using a coater; preparing another solution that includes the boron compound and a mordant; applying the another solution onto a coating layer formed by the coating liquid at a time after commencement of the step of applying the coating solution but before a falling-drying-rate period of drying of the coating layer; and curing the coating layer.

DESCRIPTION OF THE PREFERRED EMBODIMENTS

<<Inkjet Recording Sheet>>

The inkjet recording sheet of the present invention comprises a support and, on a surface of the support, a colorant-receiving layer including at least one of a compound represented by the following general formula (1) and a compound represented by the following general formula (2) and including a vapor-phase-process silica, a polyvinyl alcohol, a boron compound, and a mordant:

$$RO(CH_2CH_2O)_nH \quad (1)$$

wherein, in the formula (1): R represents a saturated hydrocarbon group having from 1 to 12 carbon atoms, an unsaturated hydrocarbon group having from 1 to 12 carbon atoms, a phenyl group, or an acyl group; and n represents an integer of 1 to 3, $$RO(CH_2CH(CH_3)O)_nH \quad (2)$$

and in the formula (2): R represents a saturated hydrocarbon group having from 1 to 12 carbon atoms, an unsaturated hydrocarbon group having from 1 to 12 carbon atoms, a phenyl group, or an acyl group; and n represents an integer of 1 to 3.

Containing at least one of compounds represented by formula (1) and compounds represented by formula (2), the colorant-receiving layer of the inkjet recording sheet of the present invention does not shrink in dry while its three-dimensional network structure (porous structure) is formed. This will be because the compound of formulae (1) and (2) in the layer may interfere with the hydrogen bond between the silanol group in the surface of the vapor-phase-process silica in the layer and the hydroxyl group in the polyvinyl alcohol therein in some degree, and the dry shrink of the layer may be thereby relieved. Accordingly, the colorant-receiving layer is prevented from cracking while its three-dimensional network structure is formed, and the yield and the quality of the inkjet recording sheet may be thereby improved.

In addition, the inkjet recording sheet is prevented from curling since the colorant-receiving layer therein does not shrink in dry, and therefore it can smoothly run in printers. Moreover, since the adhesion of the colorant-receiving layer to the support increases, the layer hardly peels off the support even when the sheet is cut or folded while it is produced, worked and used, and the sheet is easy to handle.

Further, since the colorant-receiving layer in the sheet contains a vapor-phase-process silica, a polyvinyl alcohol, a boron compound and a mordant, the glossiness, the ink absorbability, the bleeding resistance in storage and the lightfastness of the sheet are all good, and the color density (maximum density) of the images formed on the sheet is high.

<Colorant-Receiving Layer>

As mentioned above, the colorant-receiving layer of the sheet of the present invention indispensably contains at least one of compounds represented by formula (1) and compounds represented by formula (2), and at least a vapor-phase-process silica, a polyvinyl alcohol, a boron compound and a mordant, and may optionally contain various additives.

(Compounds Represented by Formulae (1) and (2))

The compounds represented by formulae (1) and (2) mentioned below are high-boiling-point solvents.

$$RO(CH_2CH_2O)_nH \quad (1)$$

wherein, in the formula (1): R represents a saturated hydrocarbon group having from 1 to 12 carbon atoms, an unsaturated hydrocarbon group having from 1 to 12 carbon atoms, a phenyl group, or an acyl group; and n represents an integer of 1 to 3, $$RO(CH_2CH(CH_3)O)_nH \quad (2)$$

and in the formula (2): R represents a saturated hydrocarbon group having from 1 to 12 carbon atoms, an unsaturated hydrocarbon group having from 1 to 12 carbon atoms, a phenyl group, or an acyl group; and n represents an integer of 1 to 3.

In formulae (1) and (2), R represents a saturated hydrocarbon group having from 1 to 12 carbon atoms, an unsaturated hydrocarbon group having from 1 to 12 carbon atoms, a phenyl group, or an acyl group, and it is preferably a saturated hydrocarbon group having from 1 to 4 carbon atoms.

The number of carbon atoms constituting the saturated hydrocarbon group is from 1 to 12, preferably from 1 to 8, more preferably from 1 to 4. The saturated hydrocarbon group includes an alkyl group and an alicyclic hydrocarbon group. The saturated hydrocarbon group may be substituted. Concretely, it includes methyl, ethyl, propyl, butyl and hexyl groups, but is preferably a methyl, ethyl, propyl or butyl group.

The number of carbon atoms constituting the unsaturated hydrocarbon group is from 1 to 12, preferably from 1 to 8, more preferably from 1 to 4. The unsaturated hydrocarbon group includes an alkyl group and an alkynyl group. The unsaturated hydrocarbon group may be substituted. Concretely, it includes vinyl, allyl, ethynyl, 1,3-butadienyl and 2-proppynyl groups, but is preferably an allyl group.

The acyl group preferably has from 1 to 8 carbon atoms, more preferably from 1 to 4 carbon atoms. It may be substituted. Concretely, it includes acetyl, propionyl, butyryl and valeryl groups, but is preferably a butyryl group.

In formulae (1) and (2), n indicates an integer of 1 to 3, but is preferably 2 or 3.

The compounds represented by formulae (1) and (2) are preferably substantially soluble in water. The terminology "soluble in water" used herein means that the compound dissolves in water to a degree of at least 1% by weight. Examples of the compounds represented by formulae (1) and (2) are ethylene glycol monomethyl ether, ethylene glycol monoethyl ether, ethylene glycol monobutyl ether, ethylene glycol monohexyl ether, ethylene glycol monoallyl ether, ethylene glycol monophenyl ether, diethylene glycol monomethyl ether, diethylene glycol monoethyl ether, diethylene glycol monobutyl ether, diethylene glycol monohexyl ether, diethylene glycol monododecyl ether, triethylene glycol monomethyl ether, triethylene glycol monoethyl ether, triethylene glycol monobutyl ether, propylene glycol monomethyl ether, propylene glycol monoethyl ether, and propylene glycol monobutyl ether; and diethylene glycol monobutyl ether and triethylene glycol monobutyl ether are preferred for use herein.

Containing at least one of compounds represented by formula (1) and compounds represented by formula (2) in its colorant-receiving layer, the inkjet recording sheet of the present invention will do. Therefore, one or more compounds represented by formula (1) or (2) may be in the layer, singly or as combined; or compounds represented by formulae (1) and (2) may be in the layer as combined. In case where the compound [x] of formula (1) is combined with the compound [y] of formula (2) to be in the layer, its blend ratio, x/y by weight, is not specifically defined, but is preferably from 100/1 to 100/100, more preferably from 100/10 to 100/50. The total content of the compounds represented by formulae (1) and (2) in the colorant-receiving layer is preferably from 0.1 to 5.0 $g/m^2$, more preferably from 0.2 to 3.0 $g/m^2$.

For improving its coatability and surface quality, the colorant-receiving layer may contain various surfactants; for preventing the frictional electrification and the peeling electrification of its surface, the layer may contain known ion-conductive surfactants; for improving its lightfastness, the layer may contain antioxidants and UV absorbents; and for improving its ozone fading resistance, the layer may contain sulfur-containing compounds, not interfering with the effect of the present invention.

(Vapor-Phase-Process Silica)

As mentioned above, the colorant-receiving layer of the recording sheet of the present invention contains inorganic pigment particles of vapor-phase-process silica.

According to their production methods, silica particles are divided into two groups; those produced in a wet process and those produced in a dry process (vapor-phase process). The principal method of the wet process comprises decomposing a silicate with an acid to form active silica followed by polymerizing it in some degree and aggregating and precipitating it to obtain hydrous silica. For the vapor-phase process, known are two principal methods. One comprises hydrolyzing a silicon halide in a high-temperature vapor phase (flame hydrolysis); and the other comprises heating, reducing and vaporizing borax and coke with arcs in an electric furnace followed by oxidizing the resulting vapor in air (arc method) to obtain anhydrous silica. The terminology "vapor-phase-process silica" used herein means the anhydrous silica particles obtained in the vapor-phase process.

The vapor-phase-process silica differs from hydrous silica in point of the surface silanol group density and the presence or absence of pores therein, and the two have different properties. The former, vapor-phase-process silica is favorable for forming a three-dimensional structure of high porosity. Though not clear, the reason will be because hydrous silica particles have a high surface silanol density of from 5 to 8 silanols/$nm^2$ and will therefore readily form dense aggregates, while, on the other hand, vapor-phase-process silica particles have a low surface silanol density of from 2 to 3 silanols/$nm^2$ and will therefore form sparse flocculates, and, as a result, they may have a structure of high porosity.

Since the vapor-phase-process silica has an especially large specific surface area, its ability to absorb and keep ink is high. In addition, since the silica has a low refractive index, the colorant-receiving layer containing it may be transparent so far as the silica particles are well dispersed to have a suitable particle size, and the layer may form good color images of high color density. The transparency of the colorant-receiving layer is a matter of importance not only for OHP sheets that require transparency but also for other ordinary sheets such as photographic glossy paper, for forming good color images of high color density and glossiness.

Preferably, the vapor-phase-process silica has a mean primary particle size of at most 30 nm, more preferably at most 20 nm, even more preferably at most 10 nm, most preferably from 3 to 10 nm. The vapor-phase silica particles readily aggregate through hydrogen bonding at the silanol groups therein. Therefore, when their mean primary particle size is not larger than 30 nm, the silica particles may form a structure of high porosity, and effectively increase the ink absorbability of the layer containing them.

If desired, the vapor-phase-process silica to be in the colorant-receiving layer may be combined with any other inorganic pigment particles such as hydrous silica particles, colloidal silica, titanium dioxide, barium sulfate, calcium silicate, zeolite, kaolinite, halloysite, mica, talc, calcium carbonate, magnesium carbonate, calcium sulfate, boehmite and pseudoboehmite. In case where the vapor-phase-process silica is combined with such additional inorganic pigment particles, the proportion of the vapor-phase-process silica to all the inorganic pigment particles in the layer is preferably at least 50% by weight, more preferably at least 70% by weight.

(Polyvinyl Alcohol)

The colorant-receiving layer of the recording sheet of the present invention contains a water-soluble resin, polyvinyl alcohol.

Not limited to ordinary polyvinyl alcohol (PVA) alone, the polyvinyl alcohol for use herein includes cation-modified polyvinyl alcohols, anion-modified polyvinyl alcohols, silanol-modified polyvinyl alcohols, and other polyvinyl alcohol derivatives. One or more different types of polyvinyl alcohols may be used either singly or as combined.

PVA has a hydroxyl group in its structural units, and the hydroxyl group therein forms a hydrogen bond with the silanol group in the surface of the silica particles, therefore facilitating the formation of a three-dimensional network structure of the chain units of secondary silica particles. It is believed that the three-dimensional network structure thus formed will make the colorant-receiving layer have a porous structure of high porosity.

During inkjet recording, the porous colorant-receiving layer thus formed in the manner as above rapidly absorbs ink through the capillaries therein, and forms ink dots of good circularity with no bleeding.

Regarding the polyvinyl alcohol content of the colorant-receiving layer, if it is too small, the strength of the layer is low and the layer readily cracks in dry; but if too large, the resin will fill up the pores in the layer to lower the layer porosity, and the ink absorbability of the layer will be thereby lowered. To evade the problems, the polyvinyl alcohol content of the colorant-receiving layer is preferably from 9 to 40% by weight, more preferably from 12 to 33% by weight of the total solid content of the layer.

For making the colorant-receiving layer transparent, PVA to be in the layer preferably has a degree of saponification of from 70 to 99%, more preferably from 80 to 99%.

If desired, the polyvinyl alcohol to be in the colorant-receiving layer may be combined with any other water-soluble resins, for example, cellulose resins [e.g., methyl cellulose (MC), ethyl cellulose (EC), hydroxyethyl cellulose (HEC), carboxymethyl cellulose (CMC)], chitins, chitosans, starch; ether bond-having resins such as polyethylene oxide (PEO), polypropylene oxide (PPO), polyethylene glycol (PEG), polyvinyl ether (PVE); amido group or amido bond-having resins such as polyacrylamide (PAAM), polyvinylpyrrolidone (PVP); and dissociating carboxyl group-having polyacrylates, maleic acid resins, alginates, and gelatins. In case where the polyvinyl alcohol is combined with such additional water-soluble resins, the proportion of the polyvinyl alcohol to all the water-soluble resins in the layer is preferably at least 50% by weight, more preferably at least 70% by weight.

Content Ratio of Vapor-phase-process Silica to Polyvinyl Alcohol

In the colorant-receiving layer, the content ratio of the vapor-phase-process silica (when combined with additional inorganic pigment particles, all the combined pigment particles; i) to the polyvinyl alcohol (when combined with additional water-soluble resins, all the combined water-soluble resins; p), the PB ratio i/p indicating the amount by weight of the vapor-phase-process silica to one part by weight of the polyvinyl alcohol in the layer, has a great influence on the film structure of the layer. Specifically, when the PB ratio increases, the porosity, the pore volume and the surface area (per unit weight) of the layer increase.

Concretely, if the PB ratio, i/p is too large, the strength of the layer is low and the layer readily cracks in dry; but if too small, the resin will fill up the pores in the layer to lower the layer porosity, and the ink absorbability of the layer will be thereby lowered. To evade the problems, the PB ratio, i/p is preferably from 1.5/1 to 10/1.

While running through the conveyor system in an inkjet printer, the recording sheet may receive stress, and therefore the strength of its colorant-receiving layer must be high. In addition, when the sheet is cut, its colorant-receiving layer should not crack or peel, and therefore the strength of the layer must be high.

For this, the PB ratio is preferably at most 5/1. In order that the layer has an ability to rapidly absorb ink in inkjet printers, the ratio is preferably at least 2/1.

For example, when a coating liquid prepared by completely dispersing the anhydrous silica particles having a mean primary particle size of at most 20 nm and the water-soluble resin in an aqueous solution at a PB ratio of from 2/1 to 5/1 is applied onto a support and dried thereon, then a three-dimensional network structure of the chain units of secondary silica particles is formed and a transparent porous film having a mean pore size of at most 30 nm, a porosity of from 50% go 80%, a relative pore volume of at least 0.5 ml/g and a specific surface area of 100 $m^2/g$ is readily formed.

(Boron Compound)

The colorant-receiving layer of the inkjet recording sheet of the present invention is a coating layer (porous layer) that contains inorganic pigment particles and a water-soluble resin, polyvinyl alcohol, further containing a boron compound that serves as a crosslinking agent capable of crosslinking the polyvinyl alcohol therein, and this is cured by crosslinking the polyvinyl alcohol with the boron compound therein.

Preferably, the boron compound is added to the layer at the same time when the coating liquid to form the porous colorant-receiving layer (colorant-receiving layer coating liquid) is applied onto the support, or while the coating layer formed by applying the colorant-receiving layer coating liquid onto the support is dried but is not as yet in a falling-drying-rate period. In this operation, the coating layer is effectively prevented from cracking while it is dried. Specifically, the boron compound solution (crosslinking agent solution) can penetrate into the coating layer at the same time when the coating liquid is applied onto the support to form the coating layer thereon or while the coating layer formed is dried but is not as yet in a falling-drying-rate period, and the boron compound rapidly reacts with the polyvinyl alcohol in the coating layer to gel (cure) it therein, whereby the strength of the coating layer is at once significantly increased.

In the present invention, also preferred for forming the colorant-receiving layer is a method of applying a coating liquid prepared by adding a solution (first solution) that contains a polyvinyl alcohol and at least one of compounds represented by formula (1) and compounds represented by formula (2) to an aqueous dispersion that comprises a vapor-phase-process silica and a dispersant, followed by re-dispersing the resulting mixture, onto the surface of a support by using a coater, and applying a mordant-containing solution (second solution) onto the coating layer simultaneously with the coating or while the coating layer formed by the coating is dried but is not as yet in a falling-drying-rate period. In this method, it is desirable that the boron compound is added to both the first solution to be added to the coating liquid and the second solution to be applied onto the coating layer.

The boron compound serving as a crosslinking agent rapidly crosses the polyvinyl alcohol. The boron compound includes, for example, borax, boric acids, borates, for example, orthoborates, $InBO_3$, $ScBO_3$, $YBO_3$, $LaBO_3$, $Mg_3(BO_3)_2$, $Co_3(BO_3)_2$, diborates (e.g., $Mg_2B_2O_5$, $Co_2B_2O_5$), metaborates (e.g., $LiBO_2$, $Ca(BO_2)_2$, $NaBO_2$, $KBO_2$), tetraborates (e.g., $Na_2B_4O_7 \cdot 10H_2O$) and pentaborates (e.g., $KB_5O_8 \cdot 4H_2O$, $Ca_2B_6O_{11} \cdot 7H_2O$, $CsB_5O_5$).

Above all, borax, boric acids and borates are preferred as they rapidly start crosslinking reaction, and boric acids are more preferred.

In case where the polyvinyl alcohol is combined with gelatin, the following compounds which are known as a hardening agent for gelatin may be combined with the boron compound as an additional crosslinking agent.

For example, they are aldehyde compounds such as formaldehyde, glyoxal, glutaraldehyde; ketone compounds such as diacetyl, cyclopentanedione; active halogen compounds such as bis(2-chloroethylurea)-2-hydroxy-4,6-dichloro-1,3,5-triazine, 2,4-dichloro-6-S-triazine sodium salt; active vinyl compounds such as divinylsulfonic acid, 1,3-vinylsulfonyl-2-propanol, N,N'-ethylenebis(vinylsulfonylacetamide), 1,3,5-triacryloyl-hexahydro-S-triazine; N-methylol compounds such as dimethylolurea, methyloldimethylhydantoin; isocyanate compounds such as 1,6-hexamethylene diisocyanate; aziridine compounds described in U.S. Pat. Nos. 3,017,280, 2,983,611; carboximide compounds described in U.S. Pat. No. 3,100,704; epoxy compounds such as glycerol triglycidyl ether; ethylenimino compounds such as 1,6-hexamethylene-N,N'-bisethyleneurea; halogenocarboxyaldehyde compounds such as mucochloric acid, mucophenoxychloric acid; dioxane compounds such as 2,3-dihydroxydioxane; chromium alum, potassium alum, zirconium sulfate, chromium acetate. In case where the boron compound is combined with such an additional crosslinking agent, the proportion of the boron compound is preferably at least 50% by weight, more preferably at least 70% by weight of all the crosslinking agents.

One or more boron compounds may be used singly or as combined.

When the boron compound is added, its solution is prepared by dissolving the boron compound in water and/or an organic solvent.

The concentration of the boron compound in the boron compound solution is preferably from 0.05 to 10% by weight, more preferably from 0.1 to 7% by weight of the solution.

The solvent to form the boron compound solution is generally water, but may be an aqueous mixed solvent that contains an organic solvent miscible with water.

The organic solvent may be any and every one capable of dissolving the boron compound, including, for example, alcohols such as methanol, ethanol, isopropyl alcohol, glycerin; ketones such as acetone, methyl ethyl ketone; esters such as methyl acetate, ethyl acetate; aromatic solvents such as toluene; ethers such as tetrahydrofuran; and halogenohydrocarbon solvents such as dichloromethane.

(Mordant)

In the present invention, the colorant-receiving layer contains a mordant for improving the waterproofness and the bleeding resistance in storage of the images formed therein.

The mordant is preferably a cationic polymer (cationic mordant). The mordant in the colorant-receiving layer interacts with the colorant, anionic dye in liquid ink and stabilizes the colorant, and therefore improves the waterproofness and the bleeding resistance in storage of the formed images.

However, if the mordant is directly added to the coating liquid to form the colorant-receiving layer, it will aggregate with the vapor-phase-process silica having anionic charges therein. If a separate solution containing the mordant is prepared independently of the silica-containing liquid, the solvent is solved. In the present invention, therefore, it is desirable that the mordant is in a separate solution (for example, in a crosslinking agent-containing solution) not containing the vapor-phase-process silica.

For the cationic mordant, a polymer mordant having, as a cationic group, a primary to tertiary amino group or a quaternary ammonium base is preferably used, but a cationic non-polymer mordant may also be used.

For the polymer mordant, homopolymers of a monomer having a primary to tertiary amino group or its salt or a quaternary ammonium base (mordant monomer), and copolymers or polycondensates of the mordant monomer with any other monomer (hereinafter referred to as "non-mordant monomer") are preferred. These polymer mordants may be used in any form of water-soluble polymers or water-dispersible latex particles.

The monomer (mordant monomer) includes, for example, trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate; quaternates with methyl chloride, ethyl chloride, methyl bromide, ethyl bromide, methyl iodide or ethyl iodide of N,N-dimethylaminoethyl (meth)acrylate, N,N-diethylaminoethyl (meth)acrylate, N,N-dimethylaminopropyl (meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide, N,N-diethylaminopropyl(meth)acrylamide methyl; and their anion-substituted sulfonates, alkylsulfonates, acetates and alkylcarboxylates.

Concretely, for example, there are mentioned trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimehtyl-3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate, trimethyl-3-(acryloylamino)propylammonium acetate.

In addition, N-vinylimidazole and N-vinyl-2-methylimidazole are also copolymerizable monomers for use herein.

The non-mordant monomer does not contain a basic or cationic moiety of primary to tertiary amino groups and their salts or quaternary ammonium bases, and does not interact with dye in inkjet ink or substantially interacts little with it.

The non-mordant monomer includes, for example, alkyl (meth)acrylates; cycloalkyl (meth)acrylates such as cyclohexyl (meth)acrylate; aryl (meth)acrylates such as phenyl (meth)acrylate; aralkyl esters such as benzyl (meth)acrylate; aromatic vinyl compounds such as styrene, vinyltoluene, α-methylstyrene; vinyl esters such as vinyl acetate, vinyl propionate, vinyl versatate; allyl esters such as allyl acetate; halogen-containing monomers such as vinylidene chloride, vinyl chloride; vinyl cyanides such as (meth)acrylonitrile; olefins such as ethylene, propylene.

Of the alkyl (meth)acrylates, those in which the alkyl moiety has from 1 to 18 carbon atoms are preferred. They include, for example, methyl (meth)acrylate, ethyl (meth) acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, stearyl (meth)acrylate.

Of those, preferred are methyl acrylate, ethyl acrylate, methyl methacrylate, ethyl methacrylate and hydroxyethyl methacrylate.

One or more of the non-mordant monomers may be used singly or as combined.

Other preferred examples of the polymer mordant are polydiallyldimethylammonium chloride, polymethacryloyloxyethyl-β-hydroxyethyldimethylammonium chloride, polyethylenimine, polyallylamine, polyallylamine hydrochloride, polyamido-polyamine resin, cationated starch, dicyandiamide-formalin condensate, dimethyl-2-hydroxypropylamminium salt polymer, polyamidine, polyvinylamine.

Preferably, the molecular weight of the polymer mordant is from 1000 to 200000, more preferably from 3000 to 60000 in terms of the weight-average molecular weight thereof. When the molecular weight of the polymer mordant used falls within the range of from 1000 to 200000, the waterproofness of the recording sheet is good, and the viscosity of the coating liquid for the colorant-receiving layer of the sheet does not increase to worsen the handlability of the liquid.

For the cationic non-polymer mordant, for example, water-soluble metal salts such as aluminium sulfate, aluminium chloride, polyaluminium chloride and magnesium chloride are preferred.

(Other Components)

The colorant-receiving layer may contain, if desired, the following components.

For preventing the colorant caught by the layer from deteriorating, the layer may contain various anti-fading agents such as UV absorbents, antioxidants, singlet oxygen quenchers.

The UV absorbents includes cinnamic acid derivatives, benzophenone derivatives, benzotriazolylphenol derivatives. For example, they are butyl α-cyano-phenylcinnamate, o-benzotriazolylphenol, o-benzotriazolyl-p-chlorophenol, o-benzotriazolyl-2,4-di-t-butylphenol, o-benzotriazolyl-2,4-di-t-octylphenol. Hindered phenol compounds are also usable for UV absorbents. Concretely, phenol derivatives substituted with a branched alkyl group at least at one of 2- or 6-position are preferred.

In addition, benzotriazole-type UV absorbents, salicylic acid-type UV absorbents, cyanoacrylate-type UV absorbents, and oxalic acid anilide-type UV absorbents are also usable. For example, they are described in JP-A 47-10537, 58-111942, 58-212844, 59-19945, 59-46646, 59-109055, 63-53544, Japanese Patent Application Bulletin (JP-B) 36-10466, 42-26187, 48-30492, 48-31255, 48-41572, 48-54965, 50-10726, U.S. Pat. Nos. 2,719,086, 3,707,375, 3,754,919, 4,220,711.

Fluorescent brighteners are also usable for UV absorbents. For example, coumarin-type fluorescent brighteners are mentioned. Concretely, they are described in JP-B 45-4699, 54-5324.

For the antioxidants, those described in EP-A 223739, 309401, 309402, 310551, 310552, 459416; GP-A 3435443; JP-A 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437, 5-170361; JP-B 48-43295, 48-33212; U.S. Pat. Nos. 4,814,262, 4,980,275 are usable herein.

Concretely, 6-ethoxy-1-phenyl-2,2,4-trimethyl-1,2-dihydroquinoline, 6-ethoxy-1-octyl-2,2,4-trimethyl-1,2-dihydroquinoline, 6-ethoxy-1-phenyl-2,2,4-trimethyl-1,2,3,4-tetrahydroquinoline, 6-ethoxy-1-octyl-2,2,4-trimethyl-1,2,3,4-tetrahydroquinoline, nickel cyclohexanoate, 2,2-bis(4-hydroxyphenyl)propane, 1,1-bis(4-hydroxyphenyl)-2-ethylhexane, 2-methyl-4-methoxy-diphenylamine and 1-methyl-2-phenylindole are mentioned for them.

One or more of the anti-fading agents may be used singly or as combined. The anti-fading agents may be in any form of aqueous solution, dispersion or emulsion, or may be encapsulated into microcapsules.

The amount of the anti-fading agent to be added to the colorant-receiving layer coating liquid is preferably from 0.01 to 10% by weight of the liquid.

For increasing the dispersibility of inorganic pigment particles therein, the coating liquid may contain various inorganic salts, and acids or alkalis that serve as a pH controlling agent.

For preventing the frictional electrification and the peeling electrification of its surface, the colorant-receiving layer may contain electroconductive metal oxide particles; and for reducing the surface friction thereof, the layer may contain various mat agents.

(Production of Inkjet Recording Sheet)

As already mentioned above, it is desirable that a mordant is introduced into the colorant-receiving layer in the process of applying a crosslinking agent solution to the support. Specifically, it is desirable that the colorant-receiving layer is formed by applying a coating liquid (colorant-receiving layer coating liquid) that contains at least one of compounds represented by formula (1) and compounds represented by formula (2) and contains a vapor-phase-process silica and a polyvinyl alcohol, onto a support by using a coater, applying a solution (crosslinking agent solution) that contains a boron compound and a mordant onto the coating layer simultaneously with the coating or while the coating layer formed is dried but is not as yet in a falling-drying-rate period, and crosslinking and curing the coating layer having the solution applied thereonto (WOW method, wet-on-wet method). In the method, the colorant-receiving layer coating liquid is alkaline, having a pH of from 8.0 to 10.0.

Alternatively, the colorant-receiving layer of the inkjet recording sheet of the present invention may also be formed by simultaneously applying the colorant-receiving layer coating liquid and the crosslinking agent solution onto a support, with a barrier solution that comprises a material not reactive with the crosslinking agent being sandwiched between them (provided that at least one of the crosslinking agent-containing solution or the barrier solution contains a mordant), followed by curing the coating layer.

As mentioned above, in the present invention, the crosslinking agent (boron compound) and the mordant are simultaneously applied to the support, and the waterproofness of the colorant-receiving layer formed on the support is thereby improved. Specifically, if the mordant is added to the coating liquid for the colorant-receiving layer, it may aggregate in the presence of the vapor-phase-process silica that has anionic charges on its surface, since the mordant is cationic. However, when the method of independently preparing the mordant-containing solution and the coating liquid for the colorant-receiving layer and separately applying them onto the support is employed, it is unnecessary to consider the aggregation of the vapor-phase-process silica and the latitude in selecting the mordant will broaden.

In the present invention, the colorant-receiving layer coating liquid that contains at least one of compounds represented by formula (1) and compounds represented by formula (2), and at least a vapor-phase-process silica and a polyvinyl alcohol is prepared, for example, as follows:

A vapor-phase-process silica is added to water (for example, in a ratio of from 10 to 20% by weight), dispersed therein with a high-revolution wet colloid mill (e.g., M Technique Co., LTD's CLEARMIX), under a high revolution condition, for example, at 10000 rpm (preferably from 5000 to 20000 rpm) for 20 minutes (preferably from 10 to 30 minutes), then an aqueous polyvinyl alcohol solution is added thereto (for example, so that the amount of PVA added may be around ⅓ of the vapor-phase-process silica), and at least one of compounds represented by formula (1) and compounds represented by formula (2) is added thereto and dispersed under the same revolution condition as above to prepare the intended coating liquid. The thus-obtained coating liquid is a uniform sol, and this is applied onto the support according to the coating method mentioned below to form the intended, porous colorant-receiving layer having a three-dimensional network structure. For the dispersing treatment in the method, various known conventional dispersing machines such as high-revolution dispersers, medium-assisted stirring dispersers (e.g., ball mills, sand mills), ultrasonic dispersers, colloid mill dispersers and high-pressure dispersers may be used. In the present invention, for efficiently dispersing lumps of particles that may be formed, colloid mill dispersers or high-pressure dispersers are preferably used.

The colorant-receiving layer coating liquid may optionally contain any of surfactants, pH controlling agents and antistatic agents.

For applying the colorant-receiving layer coating liquid onto the support, for example, any known methods using an extrusion die coater, an air doctor coater, a blade coater, a rod coater, a knife coater, a squeeze coater, a reverse coater or a bar coater may be employed.

After the colorant-receiving layer coating liquid has been applied onto the support, a crosslinking agent solution is applied to the coating layer. The crosslinking agent solution may be applied thereto before the coating layer is in a falling-drying-rate period. Specifically, after the colorant-receiving layer coating liquid has been applied onto the support, a boron compound and a mordant are introduced into the coating layer while the coating layer comes to have a falling rate of drying, and the intended colorant-receiving layer is favorably formed.

"Before the coating layer is in a falling-drying-rate period" in the method is generally from just after the coating with the colorant-receiving layer coating liquid to a period of a few minutes, and within this time, the coating layer formed shows a phenomenon of constant rate of drying, namely, the solvent content of the coating layer decreases in proportion to time. The constant-drying-rate period is described in Handbook of Chemical Engineering (pp. 707–712, by Maruzen Publishing, Oct. 25, 1980).

As mentioned above, after the colorant-receiving layer coating liquid has been applied onto the support, it is dried until it comes to have a falling rate of drying. In general, the layer is dried at 50 to 180° C. for 0.5 to 10 minutes (preferably for 0.5 to 5 minutes). Naturally varying depending on the amount of the coating liquid applied to the support, the range as above is suitable for the drying time.

For applying the crosslinking agent solution to the coating layer before the layer is in a falling-drying-rate period, for example, (1) the coating layer is further coated with the crosslinking agent solution; (2) the solution is sprayed on the layer; or (3) the support coated with the coating layer is dipped in the crosslinking agent solution.

For the method (1) of further coating the coating layer with the crosslinking agent solution, for example, any known coating method of using a curtain flow coater, an extrusion die coater, an air doctor coater, a blade coater, a rod coater, a knife coater, a squeeze coater, a reverse roll coater or a bar coater may be utilized. However, it is desirable to utilize a method of using an extrusion die coater, a curtain flow coater or a bar coater in which the coater is not brought into direct contact with the already-formed coating layer.

The amount of the crosslinking agent solution which contains at least a boron compound and a mordant and which is applied onto the colorant-receiving layer is generally from 0.01 to 10 g/$m^2$, but preferably from 0.05 to 5 g/$m^2$, in terms of the boron compound in the solution.

After the crosslinking agent solution has been applied thereto, the coating layer is heated generally at 40 to 180° C. for 0.5 to 30 minutes, and is thus dried and cured. Preferably, it is heated at 40 to 150° C. for 1 to 20 minutes.

For example, in case where the boron compound in the crosslinking agent solution is borax or boric acid, the coating layer is heated preferably at 60 to 100° C. for 5 to 20 minutes.

If desired, the crosslinking agent solution may be applied to the layer at the same time when the colorant-receiving layer coating liquid is applied onto the support.

In this case, the colorant-receiving layer coating liquid and the crosslinking agent solution are simultaneously applied onto the support (in a mode of double-layer coating) so that the colorant-receiving layer coating liquid is just above the support, and then the coating layer is dried and cured to be the intended colorant-receiving layer.

The simultaneous coating (double-layer coating) may be effected, for example, according to a coating method using an extrusion die coater or a curtain flow coater. After the simultaneous coating, the coating layer formed is dried. In this case, the coating layer is heated and dried generally at 40 to 150° C. for 0.5 to 10 minutes. Preferably, it is heated and dried at 40 to 100° C. for 0.5 to 5 minutes.

For example, in case where the boron compound in the crosslinking agent solution is borax or boric acid, the coating layer is heated preferably at 60 to 100° C. for 5 to 20 minutes.

In case where the simultaneous coating (double-layer coating) is effected, using an extrusion die coater, the two coating liquids jetted out through the die at the same time are layered at around the outlet of the extrusion die coater, namely, before they reach the support, and they are layered on the support in that condition. The coating liquids thus layered before they reach the support are readily crosslinked at the interface between the two liquids when they reach the support, and the two liquids are mixed at around the outlet of the extrusion die coater and are often thickened to interfere with the coating operation. Therefore, in the simultaneous coating method as above, it is desirable that a barrier layer coating liquid (interlayer coating liquid) of a material not reactive with the crosslinking agent is made to exist between the colorant-receiving layer coating liquid and the crosslinking solution containing a boron compound and a mordant to form three layers at the same time.

Not specifically defined, the barrier layer coating liquid may be any and every one capable of forming a liquid layer not reacting with the boron compound. For example, it may be an aqueous solution containing a minor water-soluble resin not reactive with the boron compound, or water. The water-soluble resin serves as a tackifier and is selected in consideration of its coatability. For it, for example, polymers such as hydroxypropylmethyl cellulose, methyl cellulose, hydroxyethylmethyl cellulose, polyvinylpyrrolidone and gelatin are usable.

If desired, the barrier layer coating liquid may contain a mordant.

The colorant-receiving layer in the present invention may also be formed according to a method of applying a coating liquid prepared by adding a solution (first solution) that contains at least one of compounds represented by formula (1) and compounds represented by formula (2) and contains a polyvinyl alcohol and a boron compound to an aqueous dispersion that comprises a vapor-phase-process silica and a dispersant, followed by re-dispersing the resulting mixture, onto the surface of a support, applying a solution (second solution) that contains a boron compound and a mordant onto the coating layer simultaneously with the coating or while the coating layer formed by the coating is dried but is not as yet in a falling-drying-rate period, and curing the coating layer. In this method, the first solution to form the colorant-receiving layer has a pH of from 2.5 to 4.0 and is acidic. The method is favorable since the glossiness of the layer formed is high and the layer may form images of high density.

For the dispersant, cationic polymers may be used. Preferred examples of the cationic polymers for it are homopolymers of a monomer having a primary to tertiary amino group or its salt or quaternary ammonium base, and copolymers and polycondensates of the monomer with any other monomers, such as those mentioned hereinabove for the examples of the mordant for use herein. Preferably, the dispersant is a water-soluble polymer.

Preferably, the molecular weight of the dispersant is from 1000 to 200000, more preferably from 3000 to 60000 in terms of the weight-average molecular weight thereof. If the molecular weight of the dispersant is smaller than 1000, the ability thereof to disperse the vapor-phase-process silica will be poor; but if larger than 200000, the viscosity of the aqueous dispersion will be high. The amount of the dispersant to be added to the vapor-phase-process silica is preferably from 1% to 30%, more preferably from 3% to 20% of the silica. If its amount is smaller than 1%, the dispersant will be ineffective for dispersing the vapor-phase-process silica; but if larger than 30%, it is unfavorable since the color density of the images printed on the inkjet recording sheet will lower.

For preparing the aqueous dispersion that comprises the vapor-phase-process silica and the dispersant, an aqueous dispersion of the vapor-phase-process silica is first prepared and the resulting aqueous dispersion may be added to an aqueous solution of the dispersant, or an aqueous dispersant solution may be added to the aqueous vapor-phase-process silica dispersion; or the vapor-phase-process silica and the dispersant may be mixed at a time. Not preparing the aqueous vapor-phase-process silica dispersion, a powdery vapor-phase-process silica may be directly added to the aqueous dispersant solution.

After the vapor-phase-process silica is mixed with a dispersant, the mixture may be ground, using a dispersing machine, to prepare an aqueous dispersion having a mean particle size of from 50 to 300 nm. The dispersing machine to be used for obtaining the aqueous dispersion may be any known conventional one, including, for example, high-revolution dispersers, medium-assisted stirring dispersers (e.g., ball mills, sand mills), ultrasonic dispersers, colloid mill dispersers and high-pressure disperser. For efficiently dispersing lumps of particles that may be formed, colloid mill dispersers or high-pressure dispersers are preferred.

The solvent in each step may be any of water, organic solvents or their mixed solvents. The organic solvents usable for the coating operation are, for example, alcohols such as methanol, ethanol, n-propanol, i-propanol, methoxypropanol; ketones such as acetone, methyl ethyl ketone; and tetrahydrofuran, acetonitrile, ethyl acetate, toluene.

After formed on the support, the colorant-receiving layer may be calendered. For example, using a super calender or gloss calender, it is passed through roll nips under heat and pressure. Thus calendered, the surface smoothness, the glossiness, the transparency and the strength of the layer are increased. However, since the calendering treatment will often lower the porosity of the layer (namely, the ink absorbability of the layer will be lowered), its condition must be so controlled that the porosity of the layer does not lower after the calendering treatment.

The roll temperature in the calendering treatment is preferably from 30 to 150° C., more preferably from 40 to 100° C.

The linear pressure between the rolls in the calendering treatment is preferably from 50 to 400 kg/cm, more preferably from 100 to 200 kg/cm.

Regarding its thickness, the colorant-receiving layer must have an absorption capacity capable of absorbing all liquid drops in inkjet recording. Therefore, the thickness of the layer must be determined in relation to the porosity thereof. For example, when the amount of ink to be applied to the layer is 8 $nl/mm^2$ and the porosity of the layer is 60%, the thickness of the layer must be at least about 15 $\mu$m.

In consideration of this, the thickness of the colorant-receiving layer for inkjet recording is preferably from 10 to 50 $\mu$m.

Preferably, the pore size of the colorant-receiving layer is from 0.005 to 0.030 $\mu$m, more preferably from 0.01 to 0.025 $\mu$m, in terms of the median diameter thereof.

The porosity and the pore median diameter may be measured with a mercury porosimeter (PORESIZER 9320-PC2, trade name by Shimadzu Corporation).

Preferably, the colorant-receiving layer has high transparency. For its criterion, the haze of the colorant-receiving layer formed on a transparent film support is preferably at most 30%, more preferably at most 20%.

The haze may be measured with a haze meter (HGM-2DP by Suga Test Instruments).

(Support)

For the support, any of transparent supports of a transparent material such as plastics, and opaque supports of an opaque material such as paper may be used. For making the best use of the transparency of the colorant-receiving layer, transparent supports or opaque supports of high glossiness are preferably used.

For the transparent supports, transparent materials that are resistant to radiation heat in OHP or backlight displays are preferred. The materials are, for example, polyesters such as polyethylene terephthalate (PET); and polysulfones, polyphenylene oxides, polyimides, polycarbonates and polyamides. Above all, polyesters are preferred, and polyethylene terephthalate is more preferred.

Though not specifically defined, the thickness of the transparent support is preferably from 50 to 200 $\mu$m in view of the handlability thereof.

For the opaque supports of high glossiness, those having a glossiness of at least 40% on the surface to be coated with the colorant-receiving layer are preferred. The glossiness is obtained according to the method of JIS P-8142 (method of measuring the 75-degree mirror surface glossiness of paper and paperboards). Concretely, the following supports are mentioned.

For example, they are paper supports of high glossiness, such as art paper, coated paper, cast-coated paper, or baryta paper for silver-salt photographic supports; plastic films of polyesters such as polyethylene terephthalate (PET), cellulose esters such as nitrocellulose, cellulose acetate or cellulose acetate butyrate, polysulfones, polyphenylene oxides, polyimides, polycarbonates or polyamides, which are made opaque by adding a white pigment thereto (their surface may be calendered); and supports prepared by coating the above-mentioned various types of paper supports, transparent supports or white pigment-containing films of high glossiness, with a polyolefin layer containing or not containing a white pigment.

White pigment-containing foamed polyester films (for example, foamed PET containing polyolefin particles and stretched to form pores therein) are also preferred for use herein. In addition, resin-coated paper for silver-salt photographic printing paper is also preferred.

Though not specifically defined, the thickness of the opaque support is preferably from 50 to 300 $\mu$m in view of the handlability thereof.

The supports may be treated with corona discharge, glow discharge, flames, or UV irradiation.

The base paper for resin-coated paper is described in detail.

The main material of the base paper is wood pulp. Synthetic pulp of polypropylene or synthetic fiber of nylon or polyester is optionally added to wood pulp, and this is made into paper. The wood pulp may be any of LBKP, LBSP, NBKP, NBSP, LDP, NDP, LUKP or NUKP, but it is desirable to use a larger amount of LBKP, NBSP LBSP, NDP or LDP containing much short fiber.

However, the proportion of LBSP and/or LDP is preferably from 10% by weight to 70% by weight.

The pulp is preferably chemical pulp (sulfate pulp or sulfite pulp) containing few impurities, and it may be bleached to have an increased degree of whiteness. The bleached pulp is also useful.

A sizing agent such as higher fatty acids, alkylketene dimers; a white pigment such as calcium carbonate, talc, titanium oxide; a paper reinforcing agent such as starch, polyacrylamide, polyvinyl alcohol; a fluorescent brightener; a water-retaining agent such as polyethylene glycols; a dispersant; and a softener such as quaternary ammoniums may be optionally added to the base paper.

The freeness of the pulp to be made into the base paper is preferably from 200 to 500 ml in terms of CSF. Regarding the fiber length of the pulp after beaten, it is desirable that the total of the 24-mesh residue and the 42-mesh residue defined in JIS P-8207 is from 30 to 70% by weight. Also preferably, the 4-mesh residue is at most 20% by weight.

The unit weight of the base paper is preferably from 30 to 250 g, more preferably from 50 to 200 g. The thickness of the base paper is preferably from 40 to 250 $\mu$m. While or after prepared, the base paper may be calendered to have an increased smoothness. The density of the base paper is generally from 0.7 to 1.2 $g/m^2$ (JIS P-8118).

Further, the toughness of the base paper is preferably from 20 to 200 g under the condition of JIS P-8143.

The surface of the base paper may be coated with a surface-sizing agent. The surface-sizing agent may be the same as that capable of being added to the base paper as above.

The pH of the base paper is preferably from 5 to 9, measured in a hot water extraction method of JIS P-8113.

Polyethylene to coat the face and the back of the base paper is generally low-density polyethylene (LDPE) and/or high-density polyethylene (HDPE), but other linear low density polyethylene (LLDPE) and polypropylene may be partly used.

Preferably, the polyethylene layer on which the colorant-receiving layer is formed contains rutile or anatase-type titanium oxide, fluorescent brightener or ultramarine added to polyethylene so as to improve the opacity, the whiteness and the color of the layer, like in most photographic printing paper. The titanium oxide content of the polyethylene layer is preferably from approximately 3 to 20% by weight, more preferably from 4 to 13% by weight of polyethylene. Though not specifically defined, the thickness of the polyethylene layer is preferably from 10 to 50 μm for both the face and back layers. A subbing layer may be formed on the polyethylene layer for enhancing the adhesion to the colorant-receiving layer. For the subbing layer, aqueous polyesters, gelatin and PVA are preferred. The thickness of the subbing layer is preferably from 0.01 to 5 μm.

The polyethylene-coated paper may be glossy paper, or may be mat or silky paper finely embossed while polyethylene is melt-extruded onto the base paper to coat it, like ordinary photographic printing paper.

As mentioned above, the colorant-receiving layer contains at least one of compounds represented by formula (1) and compounds represented by formula (2) and contains a vapor-phase-process silica, a polyvinyl alcohol, a boron compound and a mordant. Therefore, the colorant-receiving layer is prevented from shrinking in dry while its porous structure is formed, not lowering its ability to absorb ink. The layer does not crack and the inkjet recording sheet having the layer does not curl. In addition, the adhesion of the colorant-receiving layer to its support is high. Moreover, when the colorant-receiving layer that contains a vapor-phase-process silica has a three-dimensional network structure having a porosity of from 50 to 80%, it exhibits an excellent ink absorbability, and can form high-resolution images of high density. Further, even when stored in a high-temperature high-humidity atmosphere for long, the images formed are free from the problem of color bleeding in storage and have good lightfastness and waterproofness because of the excellent ability of the color-receiving layer to absorb ink.

The inkjet recording sheet of the present invention has a glossiness of at least 30% at 60°. The glossiness may be measured with a digital angle-varying glossmeter (Suga Test Instruments' UGV-50DP).

EXAMPLES

The present invention is described in more detail with reference to the following examples, but it is to be understood that the present invention is not limited to the Examples. In the Examples, "part" and "%" are all by weight.

Formation of Support

In a double disc refiner, wood pulp of 100 parts of LBKP was beaten to a degree of Canadian freeness of 300 ml, and 0.5 parts of epoxybehenamide, 1.0 part of anionic polyacrylamide, 0.1 parts of polyamidopolyamine-epichlorohydrin and 0.5 parts of cationic polyacrylamide, all in terms of the ratio by weight to the absolute dry weight of the pulp, were added to it. Using a Fourdrinier paper machine, this was metered and made into base paper of 170 $g/m^2$.

To control its surface size, the base paper was dipped in an aqueous 4% polyvinyl alcohol solution containing 0.04% of a fluorescent brightener (Sumitomo Chemical Industry's WHITEX BB) so that the sizing agent infiltrated into the base paper could be 0.5 $g/m^2$ in terms of the absolute dry weight, then dried, and calendered. Thus processed, the base paper had a density of 1.05.

The wire-contacted surface (back surface) of the base paper was treated with corona discharge, and then coated with high-density polyethylene of 19 μm thick, using a melt extruder. A mat resin layer was thus formed on the back surface of the base paper (the resin-coated surface is hereinafter referred to as the "back" of the base paper). The back resin layer was treated with corona discharge, and an aqueous dispersion of antistatic agent, aluminium oxide (Nissan Chemical Industry's ALUMINA SOL 100) and silicon dioxide (Nissan Chemical Industry's SNOWTEX O) in a ratio of 1/2 by weight, was applied thereto to form a layer having a dry weight of 0.2 $g/m^2$.

Further, the felt surface (face) not coated with the resin layer was treated with corona discharge, and low-density polyethylene containing 10% of anatase-type titanium dioxide, minor ultramarine and 0.01% (relative to polyethylene) of a fluorescent brightener and having MFR (melt flow rate) of 3.8 was melt-extruded onto it, using a melt extruder, to form a layer having a thickness of 29 μm. A glossy thermoplastic resin layer was thus formed on the face of the base paper to complete a support (the glossy surface is hereinafter referred to as the "face" of the support).

Example 1

Preparation of Coating Liquid for Colorant-Receiving Layer

In the composition mentioned below, (1) vapor-phase-process silica particles and (2) ion-exchanged water were mixed, and dispersed for 20 minutes using a high-revolution colloid mill (M Technique Co., LTD's CLEARMIX) at 10000 rpm. Then, the following (3) polyoxyethylene lauryl ether, (4) aqueous ammonia, (5) aqueous 9% polyvinyl alcohol solution and (6) diethylene glycol monobutyl ether were added to it, and dispersed under the same condition as above to prepare a coating liquid A for colorant-receiving layer.

The ratio by weight of the silica particles to the water-soluble resin, PB ratio (1)/(5) was 3.5/1, and the coating liquid A was alkaline, having a pH of 9.5.

Composition of Coating Liquid A for Colorant-Receiving Layer

| | |
|---|---|
| (1) Vapor-phase-process silica particles (inorganic pigment particles) (Nippon Aerosil's AEROSIL 300 having a mean primary particle size of 7 nm) | 9.9 parts |
| (2) Ion-exchanged water | 72.6 parts |
| (3) Polyoxyethylene lauryl ether (sufactant) (Kao's EMULGEN 109P (10%), having HLB of 13.6) | 7.2 parts |
| (4) Aqueous ammonia, 17 g/liter (pH controlling agent) | 5.3 parts |
| (5) Aqueous 9% polyvinyl alcohol solution (water-soluble resin) (Kuraray's PVA420 having a degree of saponification of 81.8% and a degree of polymerization of 2000) | 31.4 parts |
| (6) Diethylene glycol monobutyl ether (compound of formula (1)) | 0.6 parts |

Fabrication of Inkjet Recording Sheet

The face of the support was treated with corona discharge. Using an extrusion die coater, the coating liquid A prepared above was applied to it to a thickness of 200 $ml/m^2$ (coating step). Thus coated, this was dried with a hot air drier at 80° C. (hot air speed: 3 to 8 m/sec) to make the coating layer has a solid content of 20%. During this stage, the coating layer was in a constant-drying-rate period. Immediately after this, the coated support was dipped in a crosslinking agent solution A having the composition mentioned below, for 30 seconds, and the coating layer had 20 $g/m^2$ of the solution thereon (crosslinking agent solution applying step). Then, this was heated at 80° C. for 10 minutes (drying step). Through the process, an inkjet recording sheet (1) of the present invention was fabricated, and its colorant-receiving layer had a dry thickness of 32 μm.

Composition of Crosslinking Agent Solution A

| | |
|---|---|
| Boric acid (6%, crosslinking agent) | 25 parts |
| Aqueous solution of PAS-F5000 (20%) (mordant by Nittobo) | 7.15 parts |
| Ion-exchanged water | 68.98 parts |
| Ammonium chloride (surface pH controlling agent) | 0.2 parts |
| Aqueous ammonia (25%, pH controlling agent) | 1.67 parts |
| Polyoxyethylene lauryl ether (surfactant) (Kao's EMULGEN 109P (10%) having HLB of 13.6) | 2 parts |

Example 2

An inkjet recording sheet (2) was fabricated in the same manner as in Example 1, except that diethylene glycol monobutyl ether in the colorant-receiving layer coating liquid in Example 1 was replaced with triethylene glycol monobutyl ether.

Example 3

Preparation of Coating Liquid B for Colorant-Receiving Layer

In the composition mentioned below, (1) to (3) were mixed, and dispersed for 20 minutes using a high-revolution colloid mill (M Technique Co., LTD's CLEARMIX) at 10000 rpm. Then, a solution containing the following (4) to (8) was added to it, and dispersed at 10000 rpm for 20 minutes to prepare a coating liquid B for colorant-receiving layer.

The ratio by weight of the silica particles to the water-soluble resin, PB ratio (1)/(4) was 4.5/1, and the coating liquid B was acidic, having a pH of 3.5.

Composition of Coating Liquid B for Colorant-Receiving Layer:

| | |
|---|---|
| (1) Vapor-phase-process silica particles (inorganic pigment particles) (Tokuyama's REOLOSEAL QS30 having a mean primary particle size of 7 nm) | 10.0 parts |
| (2) Ion-exchanged water | 51.7 parts |
| (3) PAS-M-1 (dispersant by Nittobo) | 0.83 parts |
| (4) Aqueous 8% polyvinyl alcohol solution (water-soluble resin) (Kuraray's PVA124 having a degree of saponification of 98.5% and a degree of polymerization of 2400) | 27.8 parts |
| (5) Diethylene glycol monobytyl ether (compound of formula (1)) | 0.72 parts |
| (6) Polyoxyethylene lauryl ether (surfactant) (Kao's EMULGEN 109P (10%) having HLB of 13.6) | 1.2 parts |
| (7) Ion-exchanged water | 30.74 parts |
| (8) Boric acid | 0.09 parts |

Fabrication of Inkjet Recording Sheet

The face of the support was treated with corona discharge. Using an extrusion die coater, the coating liquid B prepared above was applied to it to a thickness of 200 ml/$m^2$ (coating step). Thus coated, this was dried with a hot air drier at 80° C. (hot air speed: 3 to 8 m/sec) to make the coating layer has a solid content of 20%. During this stage, the coating layer was in a constant-drying-rate period. Immediately after this, the coated support was dipped in a crosslinking agent solution B having the composition mentioned below, for 30 seconds, and the coating layer had 20 g/$m^2$ of the solution thereon (crosslinking agent solution applying step). Then, this was heated at 80° C. for 10 minutes (drying step). Through the process, an inkjet recording sheet (3) of the present invention was fabricated, and its colorant-receiving layer had a dry thickness of 32 $\mu$m.

Composition of Crosslinking Agent Solution B

| | |
|---|---|
| Boric acid (6%, crosslinking agent) | 25 parts |
| Aqueous solution of PAA-10C (10%) (mordant by Nittobo) | 20 parts |
| Ion-exchanged water | 52.8 parts |
| Ammonium chloride (surface pH controlling agent) | 0.2 parts |
| Polyoxyethylene lauryl ether (surfactant) (Kao's EMULGEN 109P (10%) having HLB of 13.6) | 2 parts |

Comparative Example 1

A comparative inkjet recording sheet (1) was fabricated in the same manner as in Example 3, except that diethylene glycol monobutyl ether was not added to the coating liquid B in Example 3.

<Quality Evaluation>

The inkjet recording sheets (1) to (3) of the present invention and the comparative inkjet recording sheet (1) fabricated as above were evaluated as follows. The results are given in Table 1.

(Glossiness)

Using a digital angle-varying glossmeter (Suga Test Instruments' UGV-50DP), the 600 glossiness of the surface of the colorant-receiving layer of each recording sheet not processed for image recording thereon was measured.

(Ink Absorption Rate)

Using an inkjet printer (Seiko Epson's PM-770C), solid images of Y (yellow), M (magenta), C (cyan), K (black), B (blue), G (green) and R (red) were printed on the colorant-receiving layer of each recording sheet. Then (after about 10 seconds), paper was pressed against the images, and the recording sheets were evaluated on the basis of the degree of ink transfer onto the paper, according to the criteria mentioned below.

[Criteria]

AA: No ink transferred onto the paper.

BB: Some ink transferred onto the paper.

CC: Much ink transferred onto the paper.

(Waterproofness)

In the same manner as in the ink absorption rate evaluation as above, solid images of Y (yellow), M (magenta), C (cyan), K (black), B (blue), G (green) and R (red) were printed on each recording sheet. After left for 3 hours as such, the sheets were dipped in water for 1 minute, and the degree of ink release into water from each sheet was visually checked. The sheets were evaluated according to the following criteria.

[Criteria]

AA: No dye released at all.

BB: Some ink released as a whole, and the color density of the images gradually lowered.

CC: All dye almost completely released in water.

(Bleeding in Storage)

Using the same printer as that used in the ink absorption rate measurement, a lattice line pattern (line width, 0.28 mm) of magenta ink and black ink adjacent to each other was printed on each inkjet recording sheet. Left as such for 3 hours after the image printing, the sheets were then stored in a thermo-hygrostat at 40° C. and 90% RH for 3 days, and the black line width on each sheet was measured. The sheets were evaluated according to the following criteria.

[Criteria]

AA: Little bleeding in storage was found, and the images were good (line width: 0.28 to 0.30 mm).

BB: Some bleeding in storage was found, but acceptable in practical use (line width: 0.31 to 0.35 mm)

CC: Much bleeding in storage was found and unacceptable in practical use (line width: 0.35 mm or more).

(Lightfastness)

In the same manner as in the ink absorption evaluation as above, solid images of Y (yellow), M (magenta), C (cyan), K (black), B (blue), G (green) and R (red) were printed on each recording sheet. Through a UV filter capable of cutting UV light not longer than 365 nm, the sheets were exposed to a lamp of XENON WEATHER-OMETER Ci65A (by Atlas) at 25° C. and 32% RH for 3.8 hours, then the lamp was put off, and the sheets were left at 20° C. and 91% RH for 1 hour. This cycle was continued for 96 hours, and the degree of fading of the color density of the images was visually checked. The sheets were evaluated according to the following criteria.

[Criteria]

AA: Faded little.

A: Faded but a little.

B: Much faded.

C: Greatly faded.

(Print Density)

Using an inkjet printer (Seiko Epson's PM-770C), a solid image of K (black) was printed on each inkjet recording sheet. After left for 3 hours as such, the reflection density of the printed surface of each sheet was measured with a Macbeth reflection densitometer.

(Handlability)

Folding Test

Each inkjet recording sheet was folded in two with its colorant-receiving layer outside, and the folded part was rubbed with a finger. The rubbed part was checked as to how the colorant-receiving layer peeled off or not. The sheets were evaluated according to the following criteria.

[Criteria]

A: The colorant-receiving layer did not peel.

B: The colorant-receiving layer peeled but a little.

C: The colorant-receiving layer peeled significantly.

(Curl)

Each inkjet recording sheet was cut into A6-size pieces, and left on a flat test board at 10° C. and 30% RH for 1 hour. With that, the height (degree of curling) of each piece from the surface of the four edges of the test board was measured. The average of the height data is the curl of the recording sheet.

(Cracking)

After dried, each inkjet recording sheet was visually checked as to whether its colorant-receiving sheet cracked or not in 40 $m^2$ of the sheet. The sheets were evaluated according to the following criteria.

[Criteria]

A: No crack was found.

B: 1 to 9 cracks were found, but acceptable in practical use.

C: 10 or more cracks were found, and unacceptable in practical use.

The results in Table 1 confirm the following: The inkjet recording sheets containing at least one of compounds represented by formula (1) and compounds represented by formula (2) have good ink absorbability, and formed high-resolution images of high density with little bleeding in storage; the images formed have good lightfastness, waterproofness and glossiness; the sheets were all well handlable, not curling; and in all the sheets, the colorant-receiving layer did not crack. In particular, the inkjet recording sheet (3) obtained in Example 3 has extremely high glossiness and print density. All the sheets had a 60° glossiness of larger than 30%.

As opposed to these, the comparative inkjet recording sheet (1) could not be handled well, and 13 cracks of the colorant-receiving layer were found in 40 $m^2$ of the sheet.

According to the present invention, there is provided an inkjet recording sheet that satisfies the following requirements: Its colorant-receiving layer has good ink absorbability, and does not shrink in dry while the porous structure of the layer is formed; the layer does not crack and the sheet having the layer does not curl, or that is, the productivity of the sheet is high, the quality of the sheet is good, and the ability of the sheet to smoothly run in printers is good; and the colorant-receiving layer well adheres to the support. According to the present invention, there is also provided an inkjet recording sheet, which is tough, not readily cracking, and has a good ink absorbability to form high-resolution images thereon. According to the present invention, there is further provided an inkjet recording sheet which is, after processed to form images thereon, highly resistant to water and glossy with no problem of time-dependent image bleeding, and is highly resistant to light such as sunlight and fluorescent light.

What is claimed is:

1. An inkjet recording sheet comprising a support and, on a surface of the support, a colorant-receiving layer including at least one of a compound represented by the following general formula (1) and a compound represented by the following general formula (2) and including a vapor-phase-process silica, a polyvinyl alcohol, a boron compound, and a mordant:

$$RO(CH_2CH_2O)_nH \qquad (1)$$

wherein, in the formula (1): R represents a saturated hydrocarbon group having from 1 to 12 carbon atoms, an unsaturated hydrocarbon group having from 1 to 12 carbon atoms, a phenyl group, or an acyl group; and n represents an integer of 1 to 3, $$RO(CH_2CH(CH_3)O)_nH \qquad (2)$$

and in the formula (2): R represents a saturated hydrocarbon group having from 1 to 12 carbon atoms, an unsaturated hydrocarbon group having from 1 to 12 carbon atoms, a phenyl group, or an acyl group; and n represents an integer of 1 to 3,

TABLE 1

| | Glossiness (%) | Ink Absorption Rate | Waterproofness | Bleeding in storage | Lightfastness | Print Density | Handlability | Curl (mm) | Cracking |
|---|---|---|---|---|---|---|---|---|---|
| Example 1 | 44 | AA | AA | AA | A | 2.00 | A | 4.0 | A |
| Example 2 | 45 | AA | AA | AA | A | 2.03 | A | 3.8 | A |
| Example 3 | 51 | AA | AA | AA | A | 2.44 | A | 3.2 | A |
| Comparative Example 1 | 50 | AA | AA | AA | A | 2.30 | B | 6.5 | B |

wherein said polyvinyl alcohol comprises a degree of saponification of from 70% to 99%; and wherein said vapor-phase-process silica in the colorant-receiving layer comprises weight i, polyvinyl alcohol in the colorant-receiving layer comprises weight p, and the content ratio by weight i/p is from 1.5/1 to 10/1.

2. The inkjet recording sheet according to claim 1, wherein the compounds represented by formulae (1) and (2) comprise a compound that is substantially soluble in water.

3. The inkjet recording sheet according to claim 1, wherein R in at least one of formulae (1) and (2) represents a saturated hydrocarbon group having from 1 to 4 carbon atoms.

4. The inkjet recording sheet according to claim 1, wherein the at least one of compounds represented by formulae (1) and (2) is selected from the group consisting of ethylene glycol monomethyl ether, ethylene glycol monoethyl ether, ethylene glycol monobutyl ether, ethylene glycol nonhexyl ether, ethylene glycol monoallyl ether, ethylene glycol monophenyl ether, diethylene glycol monomethyl ether, diethylene glycol monoethyl ether, diethylene glycol monobutyl ether, diethylene glycol monohexyl ether, diethylene glycol monododecyl ether, triethylene glycol monomethyl ether, triethylene glycol monoethyl ether, triethylene glycol monobutyl ether, propylene glycol monomethyl ether, propylene glycol monoethyl ether, and propylene glycol monobutyl ether.

5. The inkjet recording sheet according to claim 1, wherein total content in the colorant-receiving layer of the at least one of compounds represented by formulae (1) and (2) is from 0.1 to 5.0 $g/m^2$.

6. The inkjet recording sheet according to claim 1, wherein the at least one of compounds represented by formulae (1) and (2) in the colorant-receiving layer comprises a weight x of at least one compound represented by formula (1) and a weight y of at least one compound represented by formula (2), and the weight ratio x/y is from 100/1 to 100/100.

7. The inkjet recording sheet according to claim 1, wherein the vapor-phase-process silica comprises a mean primary particle size of at most 30 nm.

8. The inkjet recording sheet according to claim 1, wherein the vapor-phase-process silica comprises a mean primary particle size of from 3 nm to 10 nm.

9. The inkjet recording sheet according to claim 1, wherein the polyvinyl alcohol comprises a polyvinyl alcohol selected from the group consisting of polyvinyl alcohol, cation-modified polyvinyl alcohol, anion-modified polyvinyl alcohol, silanol-modified polyvinyl alcohol, and polyvinyl alcohol derivatives.

10. The inkjet recording sheet according to claim 1, wherein polyvinyl alcohol content of the colorant-receiving layer is from 9 to 40% by weight of total solid content of the layer.

11. The inkjet recording sheet according to claim 1, wherein the boron compound comprises a boron compound selected from the group consisting of borax, boric acids, borates, diborates, metaborates, tetraborates and pentaborates.

12. The inkjet recording sheet according to claim 1, wherein the mordant comprises a cationic mordant.

13. The inkjet recording sheet according to claim 1, wherein the colorant-receiving layer is formed by:

applying a coating liquid that includes the at least one of a compound represented by formula (1) and a compound represented by formula (2), the vapor-phase-process silica, and the polyvinyl alcohol onto the surface of the support by using a coater;

applying a solution that includes the boron compound and the mordant onto a coating layer formed by the coating liquid substantially simultaneously with applying the coating liquid or while the coating layer is drying but before a falling-drying-rate period; and curing the coating layer.

14. The inkjet recording sheet according to claim 1, wherein the colorant-receiving layer is formed by:

applying a coating liquid onto the surface of the support by using a coater, the coating liquid being prepared by adding a solution that includes the at least one of a compound represented by formula (1) and a compound represented by formula (2), the polyvinyl alcohol, and the boron compound to an aqueous dispersion that includes the vapor-phase-process silica and a dispersant, and re-dispersing the aqueous dispersion and the added solution;

applying a solution that includes the boron compound and the mordant onto a coating layer formed by the coating liquid substantially simultaneously with applying the coating liquid or while the coating layer is drying but before a falling-drying-rate period; and curing the coating layer.

15. The inkjet recording sheet according to claim 14, wherein the dispersant comprises a cationic polymer.

16. The inkjet recording sheet according to claim 14, wherein the dispersant comprises a weight-average molecular weight of from 1000 to 200000.

17. The inkjet recording sheet according to claim 1, wherein the colorant-receiving layer comprises a thickness of from 10 $\mu$m to 50 $\mu$m.

18. The inkjet recording sheet according to claim 1, wherein the sheet comprises a surface glossiness at 60° of at least 30%.

* * * * *